US006586499B2

(12) United States Patent
Bonafini, Jr. et al.

(10) Patent No.: US 6,586,499 B2
(45) Date of Patent: Jul. 1, 2003

(54) WATER-SOLUBLE BLOCKING WAX FORMULATION

(75) Inventors: James A. Bonafini, Jr., Pittsford, NY (US); Anthony D. Parrinello, Ontario, NY (US); Peter J. Tinios, New Mark, NH (US)

(73) Assignee: Bausch & Lomb Incorporated, Rochester, NY (US)

( * ) Notice: Subject to any disclaimer, the term of this patent is extended or adjusted under 35 U.S.C. 154(b) by 163 days.

(21) Appl. No.: 09/740,396

(22) Filed: Dec. 19, 2000

(65) Prior Publication Data

US 2002/0112805 A1 Aug. 22, 2002

(51) Int. Cl.[7] ............................................. C03C 27/00
(52) U.S. Cl. ........................ 523/168; 524/275; 524/487
(58) Field of Search ......................... 523/168; 524/275, 524/487

(56) References Cited

U.S. PATENT DOCUMENTS

| | | | |
|---|---|---|---|
| 3,404,488 A | 10/1968 | Cox et al. ...................... 51/284 |
| 4,084,458 A | 4/1978 | Galley .......................... 82/1 C |
| 4,193,672 A | 3/1980 | Trombley et al. ........ 351/160 R |
| 4,267,672 A | 5/1981 | Sorrells ..................... 51/284 R |
| 4,382,351 A | 5/1983 | Sorrells ..................... 51/217 L |
| 4,406,189 A | 9/1983 | Neefe .......................... 82/1 C |
| 4,455,901 A | 6/1984 | Council, Jr. ................... 82/12 |
| 4,502,909 A | 3/1985 | Tomesko .................... 156/356 |
| 4,637,697 A | 1/1987 | Freeman ..................... 351/161 |
| 4,749,530 A | 6/1988 | Kunzler ...................... 264/2.7 |
| 4,839,109 A | 6/1989 | Kaetsu et al. ................ 264/1.4 |
| 4,856,234 A | 8/1989 | Goins ...................... 51/284 R |
| 4,865,440 A | 9/1989 | Neefe .......................... 351/162 |
| 4,924,739 A | 5/1990 | Ademovic ................... 82/1.11 |
| 5,009,731 A | 4/1991 | Yoshikawa et al. ......... 156/154 |
| 5,024,527 A | 6/1991 | Harrison ..................... 356/124 |
| 5,096,937 A | 3/1992 | Yoshikawa et al. ............ 522/99 |
| 5,096,969 A | 3/1992 | Payne et al. ................. 525/222 |
| 5,115,553 A | 5/1992 | Sealey et al. .................. 29/563 |
| 5,260,000 A | 11/1993 | Nandu et al. .................. 264/2.1 |
| 5,326,413 A | 7/1994 | Esemplare et al. ......... 156/154 |
| 5,347,896 A | 9/1994 | Jones .......................... 82/125 |
| 5,380,387 A | 1/1995 | Salamon et al. ............. 156/154 |
| 5,452,031 A | 9/1995 | Ducharme ................... 351/177 |
| 5,456,864 A | 10/1995 | Wickes et al. ................ 264/2.5 |
| 5,459,184 A | 10/1995 | Bunnelle et al. ............. 524/221 |
| 5,620,717 A | 4/1997 | Wickes et al. ............... 425/175 |
| 5,748,282 A | 5/1998 | Freeman ..................... 351/161 |
| 5,754,269 A | 5/1998 | Benjamin et al. ........... 351/159 |
| 5,763,075 A | 6/1998 | Benjamin et al. ........... 428/349 |
| 5,777,717 A | 7/1998 | Martin et al. ............... 351/177 |
| 5,815,236 A | 9/1998 | Vayntraub ............... 351/160 R |
| 5,815,237 A | 9/1998 | Vayntraub ............... 351/160 R |
| 5,827,390 A | 10/1998 | Benjamin et al. ........... 156/245 |
| 5,885,700 A | 3/1999 | Weldon et al. .............. 428/212 |
| 5,916,017 A | 6/1999 | Sedlock ...................... 451/460 |
| 5,919,563 A | 7/1999 | Parish, Jr. et al. .......... 428/354 |
| 5,931,068 A | 8/1999 | Council, Jr. et al. ......... 82/1.11 |
| 5,972,251 A | 10/1999 | Shannon ..................... 264/1.7 |
| 5,975,694 A | 11/1999 | Vayntraub ............... 351/160 R |
| 6,036,313 A | 3/2000 | Benjamin et al. ........... 351/159 |
| 6,071,111 A | 6/2000 | Doke et al. .................. 425/412 |
| 6,074,290 A | 6/2000 | Ko et al. ..................... 451/390 |
| 6,086,204 A | 7/2000 | Magnante ................... 351/212 |
| 6,107,366 A | 8/2000 | Benjamin et al. ........... 523/168 |
| 6,122,999 A | 9/2000 | Durazo et al. ............... 82/1.11 |
| 6,126,528 A | 10/2000 | Sedlock ...................... 451/390 |
| 6,149,750 A | 11/2000 | Parish, Jr. et al. .......... 156/154 |

FOREIGN PATENT DOCUMENTS

| EP | 0 297 451 A1 | 6/1988 | ............. C09J/3/16 |
|---|---|---|---|
| GB | 962726 | 7/1964 | |

*Primary Examiner*—Edward J. Cain

(57) ABSTRACT

The invention provides, in a first embodiment, a blocking wax composition. The blocking wax comprises from about 50 to about 90 weight percent of a water-soluble continuous phase and from about 10 to about 50 weight percent of a discontinuous solid phase filler that is substantially inert to the continuous phase. The invention further provides a method for mounting a contact lens blank for machining.

5 Claims, No Drawings

WATER-SOLUBLE BLOCKING WAX FORMULATION

FIELD OF THE INVENTION

The present invention relates to contact lens manufacturing, and more particularly relates to improved compositions and methods for blocking a contact lens button (also termed a contact lens blank or precursor) for machining operations which form the button into a wearable contact lens.

BACKGROUND OF THE INVENTION

One common method of manufacturing contact lenses is lathing the lens from a cylindrical contact lens button. Contact lens buttons may be cut from rod stock or sheet material, or individually cast in cups using a curable liquid monomer. While it is possible to attach the button directly to the lathe chuck, this is not commonly done when cutting the front curve of the lens since the chuck of the lathe machine uses radial compression to hold the work piece in place for lathing, and as such could impart damaging forces to the optical characteristics of the button. The base curve, on the other hand, may be cut by chucking the button or by adhesively mounting the button as described below.

For lathing the front curve and/or the base curve, the button is commonly mounted to one end of a separate metal pin, also referred to as a "block" or "mandrel", the opposite end of the block being configured as a spindle for removable insertion into the chuck of the lathe. The button is typically adhered to the block with an adhesive or special type of wax called "blocking wax" in the art. While the block and button are turned, a concave (or "base") curve is lathed into the exposed end of the button opposite the adhered end. While still attached to the chuck and rotating, a second "ledge" cut may be made in the outer cylindrical surface of the button for facilitating subsequent alignment with the front curve block, this cut typically termed a "base curve reference". A "front curve" block is then removably secured to the lathed base curve surface while attempting to maintain axial alignment with the first "base curve" block which is then removed from the button. The front curve block is mounted to the lathe chuck for lathing the convex or front curve of the button to form the finished lens. Lens edging and polishing operations may also be performed on each surface of the lens prior to removal from each block.

During machining, the lens lathe cutter head applies a normal force (perpendicular to the plane of the machined surface) to the surface of the lens blank. In response to this normal force, the lens blank elastically deforms. If the amount of elastic deformation were consistent among the blanks, then the lathe operator could in theory adjust the lathe settings to reliably account for this deformation. Thus it would be desirable for the extent of elastic deformation to be consistent within batches of contact lens buttons. If a correction for elastic deformation must be factored into the machining algorithms at all, it would be desirable for that correction to be as small as possible to minimize the potential for error. Thus it would be desirable to minimize elastic deformation of the contact lens button during machining.

Conventional blocking waxes are deformable adhesives. One example of a useful blocking wax for lathing rigid gas-permeable (RGP) contact lenses Kerr Optical Soluble wax, 6502-A from Universal Photonics of Hicksville, N.Y.

The conventional way of machining an RGP contact lens is to apply a small amount of blocking wax either to the end of a mandrel or to the RGP lens button, and then to press the RGP button onto the mandrel. Mounting and removing operations of the button to and from the blocks during the entire lathing process consumes a significant amount of time and is prone to error, especially in maintaining the necessary axial alignment between the base curve block and the front curve block. If the base and front curve blocks are not aligned precisely, an undesired prism may be introduced to the resultant lens that must then be scrapped.

The conventional ways of removing the lens button from the mandrel include mechanically prying the button off of the mandrel, or heating the mandrel so that the blocking wax melts. These extra steps make the manufacturing process more expensive.

Thus it would be desirable to formulate a blocking wax composition that provides a stable adhesive base to firmly hold the lens blank to the mandrel. It would also be desirable to provide a blocking wax composition that both reduces the extent of elastic deformation in the lens blank during machining and makes that elastic deformation more predictable. Finally, it would be desirable to provide a blocking wax composition that could easily be removed from the lens button and the lathe mandrel after the machining operations are complete.

SUMMARY OF THE INVENTION

The invention provides, in a first embodiment, a blocking wax composition. The blocking wax comprises from about 50 to about 90 weight percent of a deformable water-soluble continuous phase and from about 10 to about 50 weight percent of a discontinuous solid phase filler material that is substantially inert to the continuous phase adhesive. The continuous phase preferably adheres readily to ophthalmic lens materials, and is also referred to herein as the continuous phase adhesive material.

Suitable continuous phase materials include cellulose and cellulose derivatives such as starch, modified starch, sodium carboxymethyl cellulose, microcrystalline cellulose, hydroxypropyl cellulose, acacia, tragacanth, pectin, gelatin, polyethylene glycol, and water-soluble carboxyvinyl polymers. In a preferred embodiment, the continuous phase adhesive is selected from the group consisting of poly (ethylene oxide), poly (vinyl pyrrolidone), poly(acrylic acid) and poly(vinyl alcohol). In one embodiment, the continuous phase adhesive has a molecular weight of from about 1200 to about 3500. In a preferred embodiment, the continuous phase adhesive comprises poly(ethylene oxide). The poly (ethylene oxide) adhesive of the invention preferably has a molecular weight of from about 1200 to about 2000.

Examples of continuous phase materials useful in accordance with the invention include 6502-A Kerr Optical water soluble wax, available from Universal Photonics of Hicksville, N.Y.; Crystal Bond 555HMP wax, available from AREMCO of Valley Cottage, N.Y.; Water soluble stick wax 2-M40, available from DAC Vision of Carpintera, Calif.; Optical water soluble wax, available from Lamda PolyTech of Brackley, England; AquaWax NCRS-3, available from Nikka Seiko Co., Ltd. of Tokyo, Japan; and Sol-U-Carv, available from Kerr Jewelery & Specialty Products of Orange, Calif.

Continuous phase materials useful in the invention may also be formulated by mixing a wax product containing poly(ethylene oxide) such as Carbowax PEG-1450 (available from Union Carbide of Danbury, Conn.) with a suitable antioxidant such as Irganox 1076 (available from Ciba-Geigy Corporation of Tarrytown, N.Y.).

The continuous phase of the invention may suitable include a tackifier such as Zoneste® 85, available from Arizona Chemical of Panama City, Fla.; Uni-Tac R85, available from Union Camp of Savannah, Ga.; or commercially available poly(vinyl acetate).

Additional examples of useful continuous phase materials are taught in U.S. Pat. No. 5,754,269 to Benjamin et al.; U.S. Pat. No. 5,763,075 to Benjamin et al.; U.S. Pat. No. 5,827,390 to Benjamin et al.; U.S. Pat. No. 5,885,700 to Weldon et al.; U.S. Pat. No. 5,916,017 to Sedlock; U.S. Pat. No. 5,919,563 to Parish, Jr. et al.; U.S. Pat. No. 6,126,528 to Sedlock; U.S. Pat. No. 6,107,366 to Benjamin et al.; U.S. Pat. No. 5,096,969 to Payne et al.; U.S. Pat. No. 5,326,413 to Esemplare et al.; U.S. Pat. No. 6,036,313 to Benjamin et al.; U.S. Pat. No. 5,459,184 to Bunnelle et al.; U.S. Pat. No. 6,149,750 to Parish et al.; U.S. Pat. No. 4,502,909 to Tomesko; U.S. Pat. No. 5,380,387 to Salamon et al.; U.S. Pat. No. 6,074,290 to Ku et al.; U.S. Pat. No. 5,096,937 to Yoshikawa et al.; and U.S. Pat. No. 5,009,731 to Yoshikawa all of which are incorporated by reference as if set forth at length herein.

The solid discontinuous phase material of the invention is preferably substantially insert to the poly(ethylene oxide). The term "substantially inert" as used herein means that no physical evidence of a chemical reaction is observable upon mixing the continuous phase adhesive of the invention with the discontinuous phase filler material of the invention. Useful materials for the discontinuous phase of the invention include any inert solid, preferably metal oxides and carbonates. Examples of such materials include the aluminum, calcium, titanium, and silicon oxides, for example $Al_2O_3$, $CaCO_3$, $TiO_2$ and $SiO_2$. Aluminum oxide ($Al_2O_3$).is particularly preferred.

In accordance with the invention, it has been found that formulating the blocking wax of the invention with from about 10 to about 50 weight percent of the discontinuous phase filler material improves the accuracy and repeatability of the contact lens lathing operations. The composition preferably contains from about 20 to about 40 weight percent of a discontinuous phase filler and more preferably from about 30 to about 40 weight percent of the discontinuous phase filler. In one particularly preferred embodiment, the composition contains between about 33 and about 37 weight percent discontinuous phase filler.

The blocking waxes of the invention are also water-soluble. Thus the contact lens button can be easily removed from the mandrel after machining by rinsing the button with warm water.

The invention provides, in a second embodiment, a method for mounting an ophthalmic lens blank. The method of the invention comprises releasably attaching an ophthalmic lens blank to a mounting surface by contacting the ophthalmic lens blank and the mounting surface with a blocking wax composition comprising from about 50 to about 90 weight percent of a deformable water-soluble continuous phase adhesive and from about 10 to about 50 weight percent of a discontinuous solid phase filler material that is substantially inert to the continuous phase adhesive.

The blocking wax of the invention is preferably stored at a temperature below its melting point. In a particularly preferred embodiment, the method of the invention for releasably attaching an ophthalmic lens to a lens block includes the steps of raising the temperature of the blocking wax to flow temperature, applying the portion of the blocking wax at flow temperature to the lens block or to an ophthalmic lens blank and holding the ophthalmic lens blank and the lens block in contact to releasably adhere the ophthalmic lens blank to the lens block. The blocking wax of the invention may be applied using a conventional hot-melt adhesive applicator. In this preferred embodiment, the blocking wax may be provided in the solid form, for example, in the form of solid cylindrical sticks, and fed into a conventional hot-melt adhesive applicator. Thus a first (major) portion of the blocking wax of is held in the solid state while a second (minor) portion is melted for use. In the most preferred embodiment, the blocking wax remains in the solid state until immediately before use, when an applicator melts a single dose-sized portion of the blocking wax and applies the melted blocking wax to a mandrel or to an ophthalmic lens blank.

Alternatively, the blocking wax may be applied by melting the blocking wax in a vessel (commonly referred to as a "melt pot") and applying the melted blocking wax to the mandrel or ophthalmic lens button with an applicator device such as a brush or spatula. Alternatively, the blocking wax may be applied to the mandrel or to the ophthalmic lens button by dipping either the mandrel or the button in the melted blocking wax.

The blocking wax of the invention is preferably applied at the minimum useful flow temperature. Suitable flow temperatures for the blocking wax of the invention are within the range of 45–85° C., preferably within the range of 55–60° C.

Methods for casting and machining contact lenses are taught in U.S. Pat. No. 5,380,387 to Salamon et al.; U.S. Pat. No. 5,347,896 to Jones; U.S. Pat. No. 4,455,901 to Council, Jr.; U.S. Pat. No. 4,924,739 to Ademovic; U.S. Pat. No. 6,122,999 to Durazo et al.; U.S. Pat. No. 5,972,251 to Shannon; U.S. Pat. No. 6,086,204 to Magnante; U.S. Pat. No. 5,815,236 to Vayntraub; U.S. Pat. No. 5,815,237 to Vayntraub; U.S. Pat. No. 5,931,068 to Council, Jr. et al.; U.S. Pat. No. 5,975,694 to Vayntraub; U.S. Pat. No. 6,071,111 to Doke et al.; U.S. Pat. No. 5,777,717 to Martin et al.; U.S. Pat. No. 5,748,282 to Freeman; U.S. Pat. No. 5,620,717 to Wickes et al.; U.S. Pat. No. 5,456,864 to Wickes et al. U.S. Pat. No. 5,260,000 to Nandu et al.; U.S. Pat. No. 5,347,896 to Jones; U.S. Pat. No. 5,452,031 to Ducharme; U.S. Pat. No. 5,115,553 to Sealey et al.; U.S. Pat. No. 5,024,527 to Harrison; U.S. Pat. No. 4,865,440 to Neefe; U.S. Pat. No. 4,839,109 to Kaetsu et al.; U.S. Pat. No. 4,749,530 to Kunzler; U.S. Pat. No. 4,637,697 to Freeman; U.S. Pat. No. 4,406,189 to Neefe; U.S. Pat. No. 4,193,672 to Trombley et al.; U.S. Pat. No. 4,084,458 to Galley; U.S. Pat. No. 4,382,351 to Sorrells; and U.S. Pat. No. 4,267,672 to Sorrells, all of which are incorporated by reference as if set forth at length herein.

EXAMPLES

Example 1

A first blocking wax is preparing by heating 66.5 grams of PEG-1450 to a temperature just above its melting point and mixing with 33 grams $Al_2O_3$ and 0.5 gram Irganox 1076 antioxidant. The resulting composition is shown below.

| | | |
|---|---|---|
| PEG-1450 | 66.5 wt. % | (poly(ethylene oxide) blocking wax) |
| $Al_2O_3$ | 33 wt. % | (inorganic filler) |
| Irganox 1076 | 0.5 wt. % | (antioxidant to prevent degradation) |

Example 2

A second blocking wax is preparing by heating 66.5 grams of PEG-1450 to a temperature just above its melting point and mixing with 33 grams $CaCO_3$ and 0.5 gram Irganox 1076 antioxidant. The resulting composition is shown below.

| | |
|---|---|
| PEG-1450 | 66.5 wt. % |
| $CaCO_3$ | 33 wt. % |
| Irganox 1076 | 0.5 wt. % |

Various alternate embodiments of the present invention are evident and other variations and embodiments will be evident to one skilled in the art.

What is claimed is:

1. A blocking wax comprising from about 50 to about 90 weight percent of a water-soluble continuous phase and from about 10 to about 50 weight percent of a discontinuous solid phase filler, wherein the continuous phase comprises at least one member selected from the group consisting of cellulose, cellulose derivatives and water-soluble carboxyvinyl polymers.

2. The blocking wax of claim 1 wherein the discontinuous solid phase filler is substantially inert to the water-soluble continuous phase.

3. The blocking wax of claim 1 wherein the continuous phase is selected from the group consisting of cellulose and cellulose derivatives.

4. The blocking wax of claim 1 wherein the continuous phase comprises at least one water-soluble carboxyvinyl polymer.

5. The blocking wax of claim 1 wherein the continuous phase has a molecular weight of from about 1200 to about 3500.

* * * * *